Figure 2:
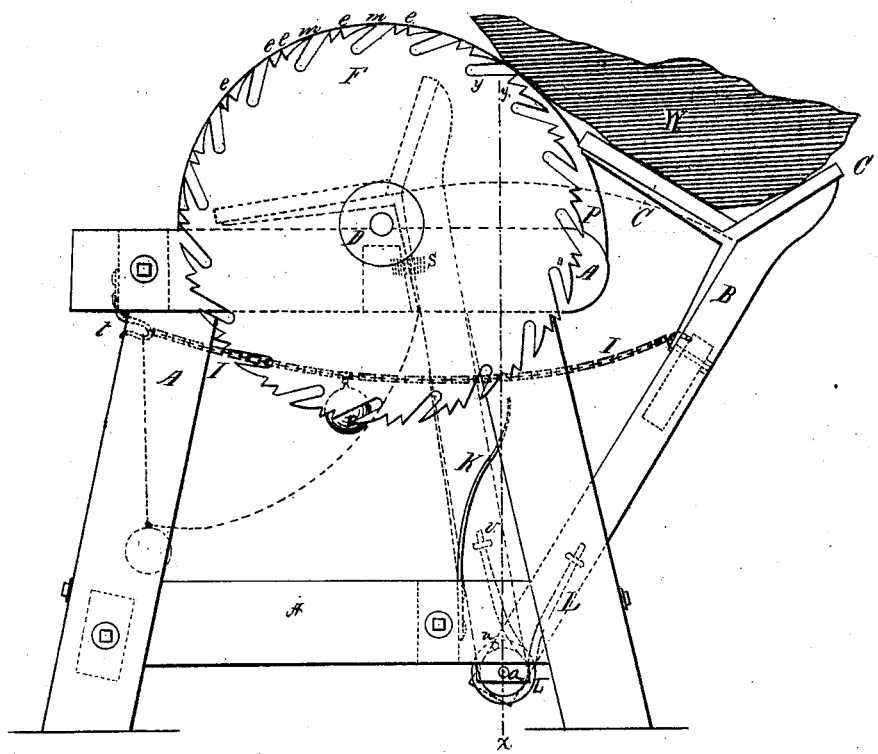

2 Sheets--Sheet 1.
G. E. BURT, C. B. BALLARD & S. B. HILDRETH.
Improvement in Sawing-Machines.
No. 128,209.             Patented June 25, 1872.
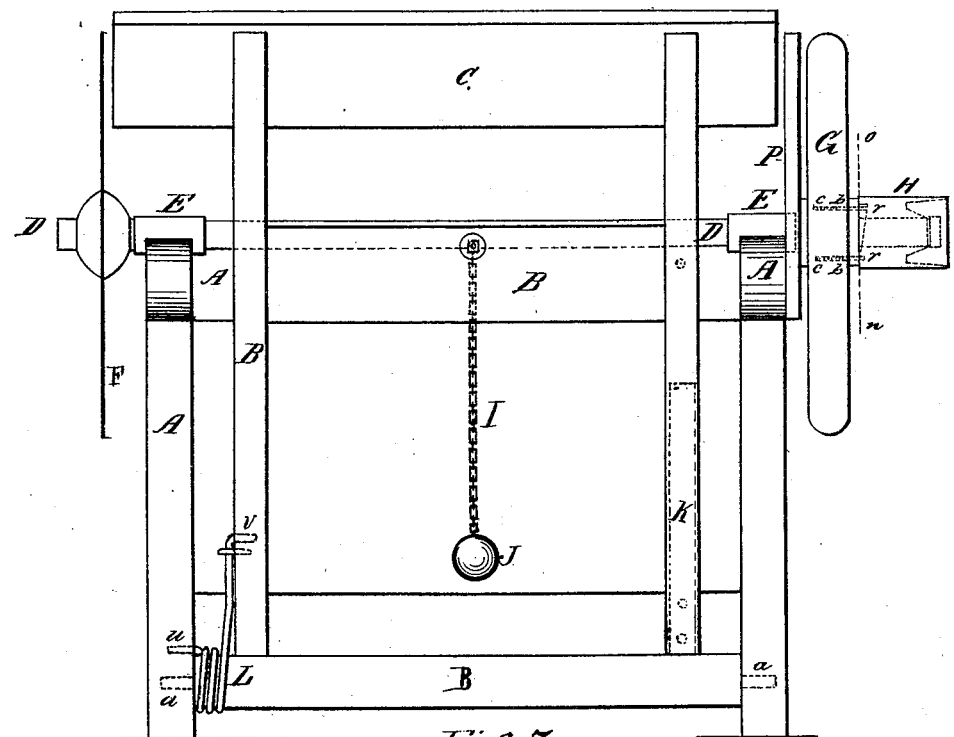
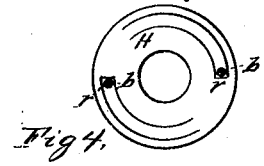
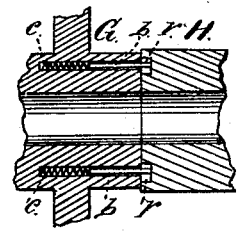
Witnesses.
Edwin A. Hildreth
Ada C. Burt.
Inventors.
George E. Burt,
Charles B. Ballard,
Stanley B. Hildreth 2 Sheets--Sheet 2.

G. E. BURT, C. B. BALLARD & S. B. HILDRETH.
Improvement in Sawing-Machines.

No. 128,209.  Patented June 25, 1872.

Witnesses.
Edwin A. Hildreth
Ada C. Burt,

Inventors.
George E. Burt
Charles B. Ballard
Stanley B. Hildreth

AM. PHOTO-LITHOGRAPHIC CO.N.Y. (OSBORNE'S PROCESS.)

128,209

UNITED STATES PATENT OFFICE.

GEORGE E. BURT AND STANLEY B. HILDRETH, OF HARVARD, MASSACHUSETTS, AND CHARLES B. BALLARD, OF HARTFORD, VERMONT.

IMPROVEMENT IN SAWING-MACHINES.

Specification forming part of Letters Patent No. 128,209, dated June 25, 1872.

SPECIFICATION.

We, GEORGE E. BURT, of Harvard, in the county of Worcester and State of Massachusetts, CHARLES B. BALLARD, of Hartford, in the county of Windsor, State of Vermont, and STANLEY B. HILDRETH, of Harvard aforesaid, have invented an Improved Table for Sawing Cord-Wood, of which the following is a specification:

*Nature and Object of the Invention.*

It is well known that in sawing cord-wood all the wood which is brought up by several men must pass through the hands of one man in sawing, and any device that will assist him and enable him to perform the work more rapidly and with greater ease would facilitate the operation of sawing wood, especially for railroads, where large quantities of wood must be sawed rapidly. The object of this invention is to construct a table which can be operated easily, rapidly, and safely for sawing cord-wood. The nature of this invention consists in constructing and pivoting a rocking table or frame so as to utilize a large portion of the saw to cut off large sticks, and to avoid the friction, wear, and necessary lubrication of commonly-constructed slides or tracks.

*Description of the Accompanying Drawing.*

Figure 1 is a front view of a machine embodying our invention. Fig. 2 is an end view of the same machine, showing that end at the left hand in Fig. 1. Fig. 3 is an enlarged sectional view through the line $o\,n$, Fig. 1, of the end of the ratchet-pulley H. Fig. 4 is an enlarged sectional view of a portion of the ratchet-pulley H and the balance-wheel G, showing the ratchet-teeth, pins, and springs.

*General Description.*

A is the main frame of the machine, which frame should be substantially constructed to resist the vibrations of the operating parts. D is the saw-arbor turning in boxes E E, which are fastened to the frame A, and is revolved by a belt running over the ratchet-pulley H, which is constructed with ratchet-teeth $r\,r$ in the end next the balance-wheel G, the hub of which should be of sufficient diameter and length to contain seats or holes for the pawl-pins $b\,b$ and the coil-springs $c\,c$, which press the pins $b\,b$ out against the teeth $r\,r$ of the ratchet-pulley H, shown in Figs. 1, 3, and 4, and thus the motion of the ratchet-pulley H is communicated through the balance-wheel G to the arbor D and saw $f$, in the desired direction for sawing. B B C is a rocking-frame pivoted to the main frame A, at points $a\,a$ in front of and below the saw-arbor D, shown in Figs. 1 and 2. The chain I is attached to the main frame A by the hook $t$, and to the rocking-frame B B C, which it holds in any desired position by varying the length of the chain on the hook $t$, shown in Fig. 2. The weight J drawing down on the chain I pulls on the rocking-frame B B C with an increasing force as the rocking-frame falls back from the saw-arbor, this force increasing in proportion as the curve of the chain I approaches a right line; the weight J and the chain I I, acting similar to a toggle-joint, pull the rocking-frame B B C forward and assist in lifting the wood against the saw. The weight J is hung at such a point in the chain I that as the frame B C comes forward and the weight of the wood is brought over and beyond a perpendicular line through the pivots $a$, as shown by the dotted lines in Fig. 2, then the weight J hangs on the hook $t$ on the rear of the frame A, so that the weight J does not hang heavily on the rocking-frame B C, in being drawn back, until after it has passed the perpendicular line through the pivot $a$. This increased and diminished force of the weight J thus arranged is nearly in proportion to the increased and diminished force necessary to operate the table in its various positions. The spring K, fastened to the frame A, bears on the frame B of the rocking-table, as it turns forward toward the arbor, and assists to press it back to its first position after a stick is cut off. The coil-spring L being attached to the main frame A at $u$, and to the rocking-frame B C at $v$, is arranged so as lift the tipping-frame forward toward the saw when it is in a position to the right hand of the perpendicular line $x\,y$ in Fig. 2, and also to throw the frame B back from the saw-arbor when in a position indicated by the dotted lines at the left of the line $x\,y$, Fig. 2, thus assisting the operator in the whole work of bringing the wood against the saw, and of drawing back the table for another cut. s is a coiled spring set in the frame A so that the tipping-frame B comes against it in its extreme forward positions, and is pressed quickly back for another cut, thus saving the force and strength of the operator. P is a guard or shield to prevent the wood from coming in contact with the balance-wheel G when it is in motion.

Rotation is communicated to the arbor D and saw F, in the direction of the arrows, by a belt running over the pulley H, which is made with ratchets, as described; and this is very important where horse-power is used, as it avoids straining the machinery, from the momentum accumulated in the balance-wheel in case of any accident, or when the horses stop. The wood W is placed on the platform C of the tipping-frame B C. The weight J, acting on the chain I and the coiled spring L, assist the operator in raising the rocking-frame with the wood on it against the saw, which, rapidly revolving, cuts off the wood; and when the stick is cut off the spring L K and s throw back the rocking-frame B C into position for another cut. It can be seen that if the wood to be sawed is small it is only necessary to move the rocking-frame B C forward and back a short distance, and the chain I can be shortened by hooking into links nearer the weight J, and thus the power exerted by the weight J on the rocking-frame is lessened in proportion to the force required to operate it; but if the wood is large the frame B C can be let back as far as desired by letting out the chain I on the hook t, and the frame B C can be pushed forward until it comes into the position shown by the dotted lines in Fig. 2. With the rocking-fame B C pivoted in this way, below and in front of the saw-arbor, a very large portion of the saw is made available for cutting off large and wide sticks of wood, which with the common slide tables would require to be turned several times to be cut off, while with this rocking-table most of them could be cut off without turning, thus saving much time and sawing the wood faster.

In saw-tables as commonly made with a frame sliding on guides or tracks the tracks are constantly wearing and are not sure to carry the wood true with the saw, which is liable to cramp and bind the saw. They also need frequent lubrication, as they are exposed to the action of sawdust and grit, and are hard to operate, and do not utilize as much of the saw as the herein-described rocking-table, which has its bearings so far apart that the wood is brought against the saw firmly and true, so as not to cramp the saw, and it is not liable to wear out of true, nor does it need much lubrication, as the bearings are well protected and the motion on the pivots is but slight.

We are aware that oscillating frames arranged outside of the overhung saw have been used, but as in such cases the stick to be cut off projects toward the saw-frame, either a very large saw must be used or the frame will interfere with the stick to be cut, and by canting the stick endanger the saw by the strain. We are also aware that an oscillating frame like ours in location has been used; but in such case the stick to be cut was carried immediately over the frame, and could only be cut by an unusually large saw, as the frame, encountering the saw-arbor, limited the movement of the stick to be cut. Our invention is distinguished from all that have been before known in this, that the stick to be cut is carried upon a close table, attached to oscillating arms pivoted below the saw-arbor, and so constructed that it can be rocked over the arbor until the vertical arms of the frame come in contact with the arbor. By this means the stick may be carried over and beyond the saw-arbor, and consequently a much larger stick can be cut on a saw than by either of the above-mentioned machines. We do not, therefore, claim, broadly, for the oscillating frame, however arranged in relation to the saw, but for a table carried on such a frame, extending over the saw-arbor, for the purpose described. We are also aware that springs have been used for retracting the frame and stick; we therefore only claim for the springs constructed to assist both in advancing and in retracting the table. We are also aware that oscillating frames swung from above have been used for carrying the wood; but these require a supplementary frame to support them, and are, therefore, very much more expensive, and take more room, and are less conveniently moved; besides this, the tendency of the action of gravity is to swing the stick onto the saw, and the liability to accidents is, therefore, greater than in our machine, where the weight of the stick tends to keep it away from the saw, with which it can only be brought in contact by the action of the operator; and, finally, the stick, approaching the saw in the arc of a circle the center of which is below the saw, comes more properly within the action of the teeth of the saw than when introduced on an arc having its center above, so that our invention is clearly distinguishable from this class of cases.

*Claim.*

What we claim as our invention, as an improvement in machines for sawing fire-wood, is—

A table attached to an oscillating frame, pivoted below the saw-arbor, and arranged to extend over the arbor and beyond the same, in combination with the saw and arbor, substantially as set forth.

GEORGE E. BURT.
   CHARLES B. BALLARD.
   STANLEY B. HILDRETH.

Witnesses:
 EDWIN A. HILDRETH,
 ADA C. BURT.